United States Patent [19]

Le Deit et al.

[11] Patent Number: 4,768,626
[45] Date of Patent: Sep. 6, 1988

[54] SAFETY DEVICE AGAINST UNSCREWING FOR THE SLIDING MEMBER OF A DISC BRAKE

[75] Inventors: Gérard Le Deit, Courtry; Jean-Louis Gerard, Paris, both of France

[73] Assignee: Bendix France, Drancy, France

[21] Appl. No.: 69,552

[22] Filed: Jul. 2, 1987

[30] Foreign Application Priority Data

Jul. 16, 1986 [FR] France ............... 86 10347

[51] Int. Cl.⁴ .................... F16D 65/02; F16D 55/224
[52] U.S. Cl. ............... 188/73.44; 411/373; 411/910
[58] Field of Search ............ 188/73.43, 73.44, 73.45; 411/429, 430, 431, 372, 373, 377, 910

[56] References Cited

U.S. PATENT DOCUMENTS

| 2,407,928 | 9/1946 | Herreshoff et al. | 411/373 X |
| 4,475,633 | 10/1984 | Gerard et al. | 188/73.44 X |
| 4,645,397 | 2/1987 | Howe | 411/372 X |

FOREIGN PATENT DOCUMENTS

| 0147522 | 7/1985 | European Pat. Off. | |
| 2242870 | 3/1974 | Fed. Rep. of Germany | 411/373 |
| 2619984 | 11/1976 | Fed. Rep. of Germany | |
| 2306371 | 10/1976 | France | 188/73.45 |
| 2422863 | 12/1979 | France | 188/73.44 |
| 2518201 | 6/1983 | France | |
| 2550836 | 2/1985 | France | |
| 2128277 | 4/1984 | United Kingdom | |
| 2160600 | 12/1985 | United Kingdom | |

Primary Examiner—George E. A. Halvosa
Attorney, Agent, or Firm—Larry J. Palguta; Ken C. Decker

[57] ABSTRACT

The invention relates to a safety device for disc brakes. The purpose of the device is to prevent the accidental disassembly of a column forming part of a sliding-caliper disc brake. A cap 51 is rotatably coupled with the head of a bolt 48 forming part of the column and screwed onto a stationary support. The cap has a skirt 59 with a cutout 60 in the shape of an arc of a circle, bounded by stops 50, 50'. In the case of accidental unscrewing of the bolt, one of the stops 50, 50' comes to rest against a stationary part 24 of the brake to prevent further unscrewing. Application to the braking of motor vehicles.

8 Claims, 2 Drawing Sheets

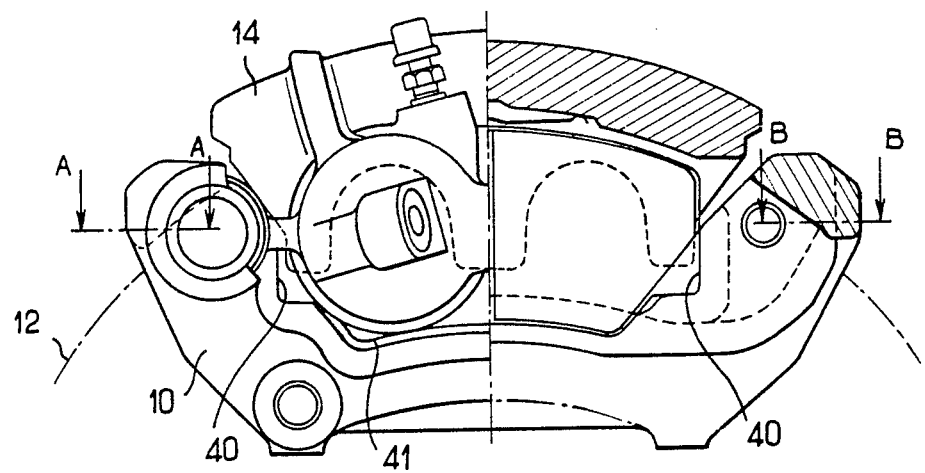
FIG_1
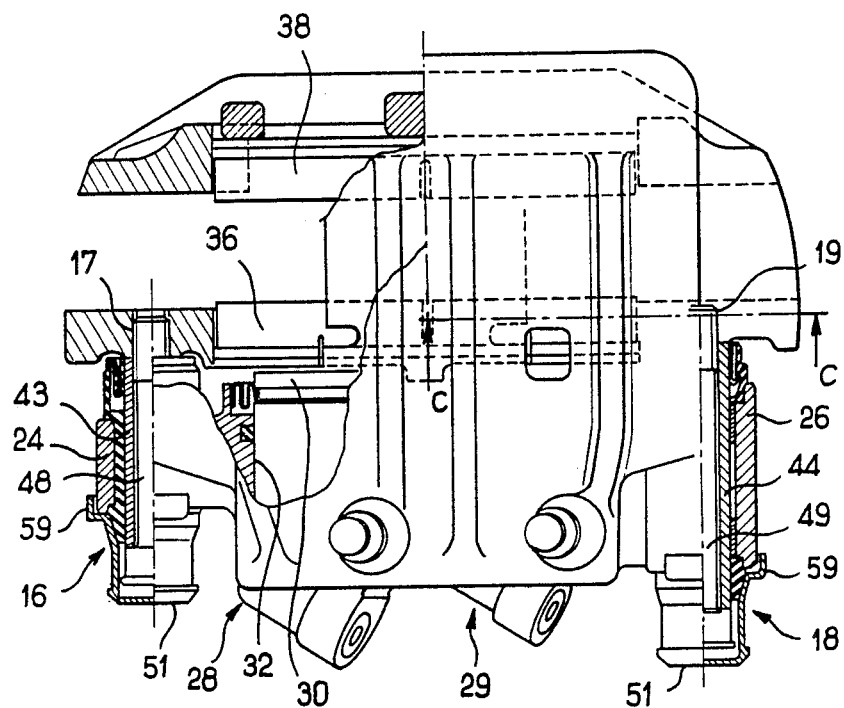
FIG_2

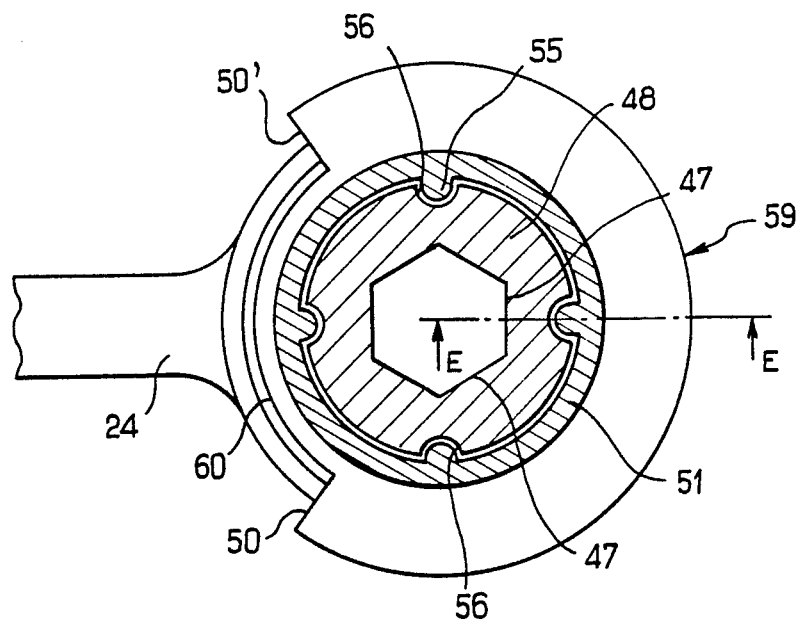
FIG._3
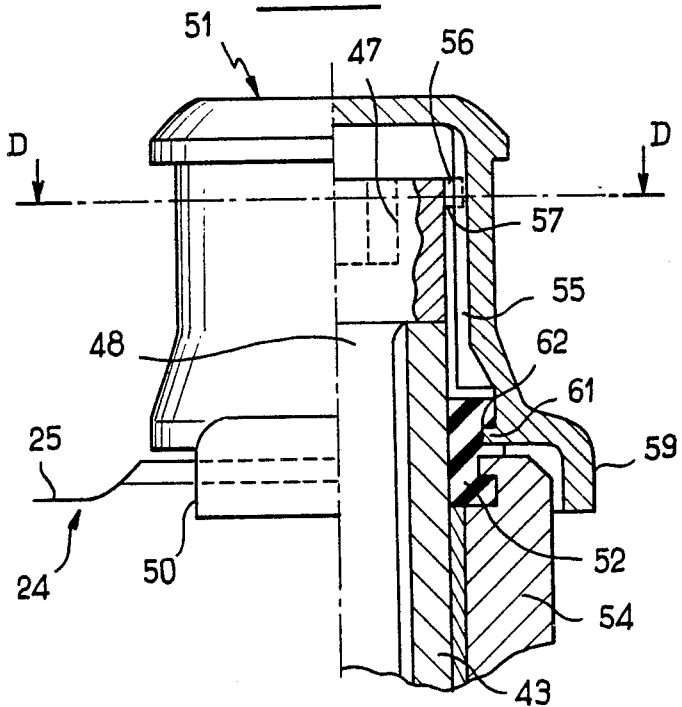
FIG._4

SAFETY DEVICE AGAINST UNSCREWING FOR THE SLIDING MEMBER OF A DISC BRAKE

The present invention relates to a safety device against unscrewing and, more particularly, to such a device designed to be combined with a sliding member forming part of a disc brake.

Typically, such a brake may comprise a caliper mounted slidably by means of at least one sliding member, such as an axial column or pin, on a stationary support in which two friction components capable of frictionally engaging the opposite faces of a rotating disc, under the action of a brake motor acting directly on one of the friction components and acting on the other friction component by reaction through the sliding caliper, are received, with anchorage and sliding.

Each pin is mounted on the stationary support by screwing a threaded end of this pin into a complementary threaded bore, drilled in the stationary support.

Under the influence of vibrations experienced by the brake, it may happen in the long run that the threaded end becomes unscrewed more or less completely.

A partial unscrewing results in the introduction of play detrimental to the satisfactory operation of the brake. However, a simple retightening of the threaded part, if done in time, enables normal operation of the brake to be restored.

A complete unscrewing of the threaded part may have serious consequences: drop and loss of the pin, tilting of the caliper and knocking of this caliper against the wheel concerned, when the vehicle is moving. A loss of brake safety and serious damage to the members affected by this breakdown result therefrom.

The object of the present invention is to provide a safety device against unscrewing which, combined with a sliding member of the disc brake, enables the occurrence of such events to be prevented.

According to the present invention there is provided safety device against unscrewing for a sliding member of a disc brake with a caliper sliding on a stationary support and comprising two friction components received in the stationary support and capable of frictionally engaging the opposite faces of a rotating disc under the action of a brake motor acting directly on one of the friction components and acting on the other friction component by reaction through the sliding caliper, the sliding member being fastened by screwing a threaded part onto the caliper or the stationary support, this member being slidably received into a corresponding bore formed in the stationary support or the caliper, respectively, which device is characterized in that it comprises a cap mounted coaxially on the sliding member so as to be rotatably integral with this member, and stop means distributed between the cap and the body of the brake so that a limited rotation of the sliding member from its tightly screwed position, causes these means to come into abutment and the unscrewing of the member to be stopped.

The invention also relates to a movable safety cap against unscrewing for the sliding member of a disc brake, designed to be incorporated into the device according to the invention. The invention further relates to a sliding-caliper disc brake fitted with the safety device according to the invention.

By virtue of the device according to the invention, a possible unscrewing of the sliding member remains limited to a small angle, which does not entail a malfunctioning of the brake. Additionally, the loss of safety following a complete unscrewing of this member, and the damage resulting therefrom to the brake itself and to the wheel of the vehicle concerned, are avoided.

The invention will now be described by way of example with reference to the accompanying drawing in which FIG. 1 is a front view, in partial section along the section line C—C of FIG. 2, of a disc brake fitted with the device according to the invention;

FIG. 2 is a top view of the disc brake of FIG. 1, some portions of which are shown in partial sections along the section lines A—A and B—B of FIG. 1;

FIG. 3 is an enlarged view, along the section line D—D of FIG. 4, of the device according to the invention forming part of the brake of FIGS. 1 and 2;

FIG. 4 is an enlarged view in partial section along the line E—E of FIG. 3, of the device according to the invention.

The disc brake shown in FIGS. 1 and 2 comprises a support 10 intended to be associated with a stationary part of the vehicle and consisting, in the embodiment part of a plate arranged in the neighborhood of a disc 12 intended to be rotatably combined with a wheel of the vehicle (not shown). The stationary support 10 slidably receives a movable caliper 14 straddling the disc. The caliper slides on the stationary support by means of sliding members such as axial pins 16 and 18 spaced apart along the circumference, the axes of which are substantially parallel to the axis of the disc 12. The pins 16 and 18 are arranged between the stationary support 10 and the arms 24 and 26 of the caliper 14. The caliper 14 comprises actuating means 28, 29, each consisting of a hydraulic brake motor comprising a piston 30, slidably mounted in a bore 32 defined in the caliper 14, sensitive to the pressure prevailing in a control chamber capable of being connected to a pressure source such as, for example, the master cylinder of a vehicle. The piston 30 is arranged so as to push a first friction component 36 directly against a first face of the disc 12 when the fluid under pressure enters the control chamber. The caliper 14 then moves by reaction and slides on the pins 16 and 18, pushing a second friction component 38 against the other face of the disc 12. As shown, especially in FIG. 1, the friction component 36 is held slidingly and with anchorage by the circumferentially spaced edges 40 of an opening 41 provided in the stationary support 10. In an identical manner, the friction component 38 is also received with anchorage and sliding on the stationary support 10. As shown, especially in FIG. 2, the two pins 16 and 18 are mounted on the stationary support 10 by means of a threaded part 17, 19, respectively. More precisely, the pins 16 and 18, which enable the caliper to slide, each consist of a ring 43, 44 centered around a bolt 48, 49 screwed at 17, 19 into the stationary support, respectively.

Reference is made to FIGS. 3 and 4, in which the device according to the invention is shown incorporated into the head of the pin 16. It is clear that the head of the pin 18 is fitted with an identical device which will therefore not be described.

In these figures, it can be seen that the device according to the invention comprises a cap 51 inserted onto the bolt head 48. Incidentally, it will be noted that this bolt head has a hexagonal recess 47. This recess enables the ring 43 - bolt 48 assembly to be fastened to the support 10 by screwing, with the aid of a key (not shown).

The cap 51 has a hollow cylindrical part provided with axial ribs 55 distributed uniformly on the inner surface of its inner cylindrical wall. It is seen in FIG. 3 that these ribs 55 are complementary to the notches 56 cut out along the periphery of a collar of the bolt head 48. by pushing the cap onto the bolt head so that the ribs on one enter into the notches in the other, the rotatable coupling of these two parts is ensured.

According to the invention, the base of the cap 51 widens radially taking the shape of a skirt 59 which does not extend over the entire periphery of the cap, but only over a circular sector. Thus, the skirt has a cutout 60 in the form of an arc of a circle, bounded by stops 50, 50'. This skirt extends below (with reference to FIG. 4) the upper surface 25 of the arm 24 adjacent to the pin 16, whereas the cutout 60 in this skirt clears a passage for this arm, which passes between the stops 50, 50' when the cap is inserted onto the bolt head, in a suitable direction. It is clear, in this respect, that the circular extension of the cutout 60 is related to the thickness of the arm 24 (with reference to FIG. 3) on the one hand, and also to the spatial periodicity of the ribs and notches 55, 56 for coupling the cap to the bolt head, so as to enable the cap to be inserted onto the bolt head despite variations in the spacing of the threads on the bolt.

The operation of the device according to the invention will now be described assuming that vibrations, for example, cause an unscrewing of the bolt 48 in the anticlockwise direction (with reference to FIG. 3). It is immediately seen that the bolt head, in its rotation, carries the cap 51 until the stop 50' which limits on the upstream side the cutout 60 of the skirt 59 of the cap, comes to rest on the adjacent face of the part 25 of the arm 24. The unscrewing of the bolt 48 is then prevented from proceeding, after a slackening by a fraction of a turn only. The drop and the loss of the pin are thus made impossible, and this precludes any lack of safety from this point of view and any possible damage inflicted on the brake or on the wheel concerned.

The axial fastening of the cap onto the pin head can be improved by providing an annular connection through the rib 61 and the groove 62. According to one embodiment of the invention, the groove 62 may be hollowed out in a leakproof seal 52 slid over the ring 43. The cap being molded using a suitable plastic material, it is pushed over the pin head so that the annular rib 61 slots elastically into the groove 62, to interlock the cap and the column axially, like many a conventional closure container. The dismantling of the cap is then carried out manually or with a special tool.

The invention is, of course, not limited to the embodiment described and shown, which was described only by way of example. Thus, the rotatable coupling of the cap and the bolt head may be achieved using a part such as a finger made by molding with the cap and fitting in a complementary fashion into the hexagonal recess 47 on the bolt head.

Likewise, the cap need not be entirely removable in relation to the column head, but may only be axially movable on the latter, to engage or disengage the cutout in the skirt and the part 25 of the arm 24.

It is also clear that the ribs and notches of the embodiment of the device according to the invention described above, may be reversed in position or replaced by any hollow and projection pair capable of fulfilling the same functions.

Similarly the device of the present invention could be adapted to be associated with a pin screwed on the caliper of the disc brake and slidably received in a stationary support.

We claim:

1. A safety device against unthreading for a sliding member of a disc brake with a sliding caliper on a stationary support and comprising two friction components received at the stationary support and capable of frictionally engaging opposite faces of a rotating disc under the action of a brake motor acting directly on one of the friction components and acting on the other friction component by reaction through the sliding caliper, the sliding member fastened by screwing a threaded part on to one of the caliper and the stationary support, the sliding member being received slidably in a corresponding bore formed in one of the stationary support and the caliper, respectively, characterized in that the device comprises a cap mounted coaxially on the sliding member so as to be rotatably integral with the sliding member, and stop means distributed between the cap and a body of the brake so that a limited rotation of the sliding member from a tightly threaded position causes the stop means to come into abutment with the body and unthreading of the sliding member to be stopped, the stop means comprising a skirt projecting radially from the cap, the skirt having a cutout in the shape of an arc of a circle comprising an angular opening of which a trailing end, in a direction of an unthreading of the sliding member, forms an abutment surface designed to cooperate with an associated abutting surface on said body of the disc brake in order to stop the rotation of the sliding member in said direction.

2. The device according to claim 1, characterized in that the cap is removable.

3. The device according to claim 1, characterized in that the cap and sliding member are made rotatably integral by the cooperation of complementary hollows and projections which interfit axially.

4. The device according to claim 3, characterized in that the hollows and projections have a circular periodicity and that the angular opening of the cutout in the skirt of the cap depends on the periodicity.

5. The device according to claim 4, characterized in that the sliding member comprises a bolt head of regularly polygonal cross-section integral with the threaded part and in that the cap comprises a part complementary to the head in order to ensure by interlocking the rotational coupling of the cap to the head.

6. The device according to claim 5, characterized in that the sliding member comprises a bolt head integral with the threaded part, the bolt head having axial hollows or projections on a peripheral surface, which are complementary to the projections or hollows, respectively, formed on an internal cylindrical wall of the cap.

7. The device according to claim 6, characterized in that the cap comprises an annular rib or groove complementary to an annular groove or rib on the sliding member, respectively, in order to ensure axial coupling of the cap to the sliding member, the rib and groove able to engage or to disengage resiliently by elasticity.

8. The device according to claim 7, characterized in that one of the groove and rib is formed on a leakproof seal forming part of the sliding member.

* * * * *